May 31, 1938. A. SORENSON 2,118,988
HEAT DISTRIBUTOR
Filed Feb. 23, 1937
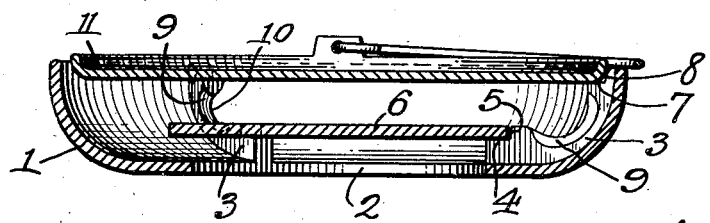
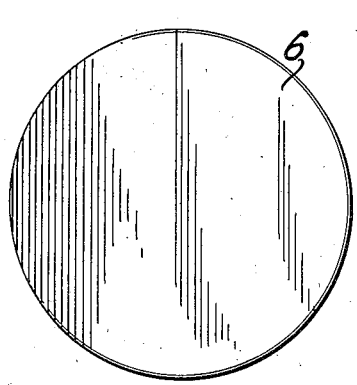
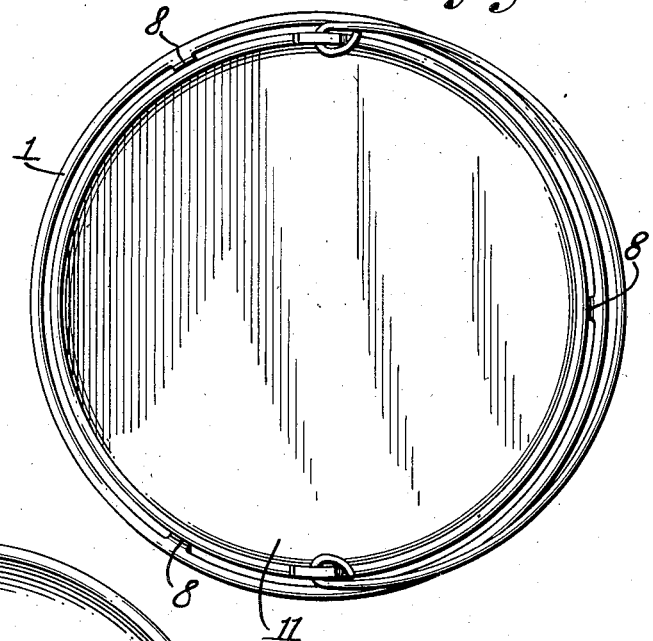
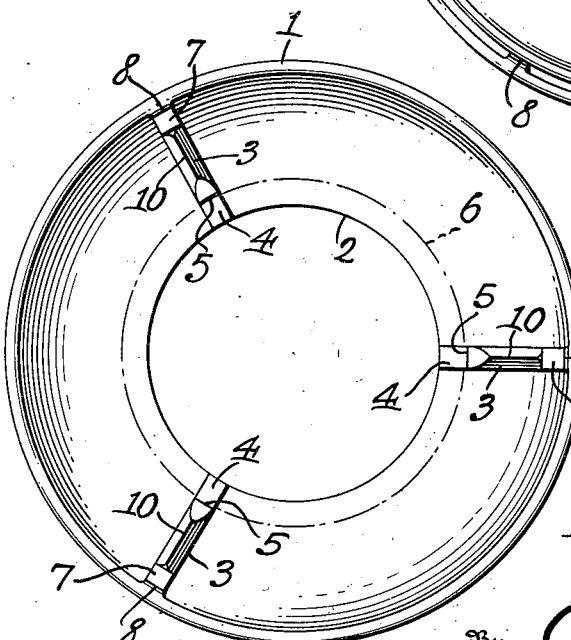
Inventor
Albert Sorenson
By C. A. Snow & Co.
Attorneys.

Patented May 31, 1938

2,118,988

UNITED STATES PATENT OFFICE 2,118,988

HEAT DISTRIBUTOR

Albert Sorenson, Chicago, Ill.

Application February 23, 1937, Serial No. 127,286

1 Claim. (Cl. 126—214)

This invention aims to provide a device, adapted to be mounted on a heating stove of any kind, and so constructed that the heat will be distributed evenly to a utensil. The invention aims to provide novel means for supporting the plate which spreads the heat, and to provide novel means for supporting the utensil and spacing it from the side wall of the base of the device. A further object of the invention is to provide a device of the class described which can be constructed cheaply and be capable of being taken apart readily for cleaning.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in transverse section, a device constructed in accordance with the invention;

Fig. 2 is a top plan of the structure shown in Fig. 1;

Fig. 3 is a top plan of the base, the spreader being removed;

Fig. 4 is a top plan of the spreader.

The device forming the subject matter of this application preferably is made of metal throughout, and comprises a cup-shaped base 1 having an upstanding wall, the base being provided in its bottom with a large central opening 2. Upstanding brackets 3 are arranged around the opening 2 and are joined both to the bottom of the base and to the upstanding wall of the base, the lower ends of the brackets 3 extending inwardly to the opening 2, and the upper ends of the brackets extending upwardly to the upper edge of the base 1.

The brackets 3 are provided at their lower ends with substantially horizontal seats 4 having substantially vertical shoulders 5 at their inner ends. A spreader plate 6, ordinarily of circular outline, rests on the seats 4 and is spaced thereby from the opening 2, so that heat can ascend about the periphery of the spreader plate 6. The shoulders 5 retain the spreader plate 6 against shifting horizontally.

The upper ends of the brackets 3 are supplied with substantially horizontal seats 7, for the support of a utensil 11. The utensil is shown in the form of a griddle, but any other utensil may be used. The seats 7 are provided at their upper ends with substantially vertical shoulders 8 constituting means for spacing the periphery of the utensil 11 from the upstanding wall of the base 1, whereby a proper upward circulation of heat may be secured. In order to promote the ready flow of heat beneath the utensil 11, the brackets 3 are cut away intermediate their ends to form concavities 9, the concaved portions of the brackets 3 being brought to an edge, as shown at 10, better to facilitate the movement of heat.

It is to be observed that the shallow, bowl-shaped base 1 has a flat, horizontal bottom, a vertical upper edge portion and a concaved intermediate portion. The imperforate metal spreader plate 6 is disposed parallel to the bottom of the body and extends outwardly beyond the edge of the large opening 2, the periphery of the plate being spaced from the concaved intermediate portion of the base to define an annular passage for heat. The central portion of the spreader plate 6 is exposed directly to heat, through the opening 2. The parallel disposition of the spreader plate 6 and the bottom of the base 1 tends to check the rise of heat about the spreader plate 6 and effects an equal heating of the spreader plate, a construction which, taken with the fact that the spreader plate is of uniform thickness, and of single layer metal construction, causes the spreader plate to heat the central part of the utensil 11 chiefly by radiation and by a radiation that is substantially uniform. The seats 4 and the shoulders 5, and the seats 7 and the shoulders 8 are not mere supports for vessels or utensils of different sizes. They have another and an unobvious function, in that they determine the relative areas of the spreader plate 6 and the bottom of the utensil 11, which is of importance, since the central portion of the utensil 11 is heated mainly by radiation from the spreader plate 6. The parts 4—5 and 7—8 have another function in that they determine the vertical distance between the spreader plate 6 and the bottom of the utensil 11, and the vertical distance between the spreader plate 6 and the bottom of the base 1, which are conditions likewise of importance in view of the fact that radiation from the spreader plate 6 is relied on mostly to heat the central portion of the utensil 11. The parts 7—8 define an annular outlet for heat, about the periphery of the utensil 11 and any utensil which will fit within the shoulders 8 can be used, it being unnecessary to provide a utensil of such unusual construction that it has an opening for the passage of heat, which must be surrounded by an upwardly projecting marginal flange to retain the material to be heated, on the utensil. The concaved intermediate portion of the base and the vertical upper edge of the base facilitate a quick rise of heat about the periphery of the utensil 11. It has been found that a piece of chicken or other edible will be browned evenly, regardless of the part of the utensil 11 on which it is placed.

Having thus described the invention, what is claimed is:

In a device of the class described, a shallow, bowl-shaped base having a flat, horizontal bottom, a vertical upper edge portion and a concaved intermediate portion, the bottom having a large central opening, a single-layer, imperforate metal plate of uniform thickness disposed parallel to the bottom and extending outwardly beyond the edge of the opening, the periphery of the plate being spaced from the concaved intermediate portion of the base to define an annular passage for heat, and means for supporting a utensil within the upper end of the base, in peripherally spaced relation to the vertical edge portion of the base, to define an annular outlet for heat, said means embodying parts which determine the relative areas of the spreader plate and the bottom of the utensil and determine the vertical distance between the spreader plate and the bottom of the utensil, and the vertical distance between the spreader plate and the opening, the central portion of the spreader plate being directly exposed to heat, through the opening, the parallel disposition of the spreader plate and the bottom tending to check the rise of heat about the edge of the spreader plate and effecting an equal heating of the spreader plate, whereby the spreader plate will heat the central part of the utensil chiefly by radiation, the concaved intermediate portion of the base and the vertical upper edge of the base facilitating a quick rise of heat about the periphery of the utensil.

ALBERT SORENSON.